May 5, 1970 F. PANTANO 3,509,859
FUEL ATOMIZATION AND FUEL-AIR MIXTURE CONTROL UNIT
Filed Aug. 24, 1967
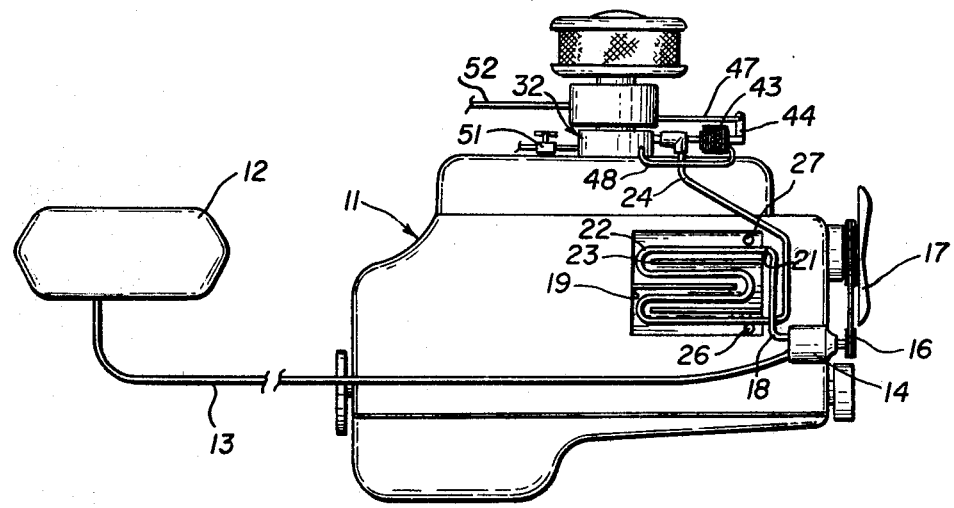
Fig_1
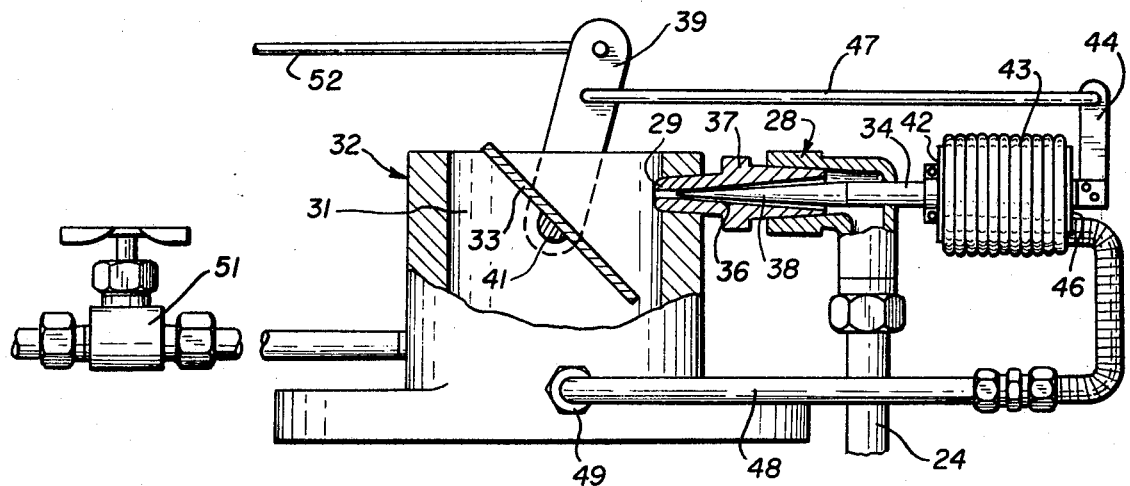
Fig_2
INVENTOR.
FRANK PANTANO
BY
ATTORNEY

United States Patent Office 3,509,859
Patented May 5, 1970

3,509,859
FUEL ATOMIZATION AND FUEL-AIR MIXTURE CONTROL UNIT
Frank Pantano, 866 Kalamath St., Denver, Colo. 80204
Filed Aug. 24, 1967, Ser. No. 663,000
Int. Cl. F02d *33/007;* F02m *7/22, 31/16*
U.S. Cl. 123—122                                                                 3 Claims

ABSTRACT OF THE DISCLOSURE

A system and apparatus for atomizing fuels for internal combustion engines and for the regulation of the fuel to air mixture that is to be used inclusive of means for elevating the temperature and pressure of the fuel prior to injected release in an intake manifold at a low pressure zone of flow control with linkage elements interconnecting fuel and air flow regulating components for cooperatively establishing basic fuel to air mixture ratios and with vacuum or engine demand sensitive elements for modification of said basic ratio by changes in the operations of said linkage elements.

BACKGROUND OF THE INVENTION

The invention in general is directed to the field of internal combustion engine carburetion. In this field there have previously been many developments. Some of the earlier developments have been directed to the pressured introduction of fuel into a venturi section. Likewise, some earlier patents have incorporated flow compensating devices inclusive of bellows assemblies connected to the intake manifold so that additional fuel will be delivered to the engine when the engine is pulling a high vacuum. While it is acknowledged that earlier inventors have used components of the present invention, it is believed that the particular combination here presented is new and novel and that it represents a more efficient and economical improvement in the general field described.

SUMMARY OF THE INVENTION

Briefly stated, the present invention provides an internal combustion engine fuel and air introduction and mixing system in which atomized fuel is delivered to an air controlling venturi section utilizing a butterfly valve. Fuel delivered to a metering flow control valve is at an elevated temperature and pressure to keep the fuel in a liquid state ahead of its point of flow metered discharge in the mixing throat. As the fuel is discharged into the venturi of the mixing throat and into the vacuum conditions there present at this intake section of the engine, the instant pressure decrease insures fine atomization of the fuel.

In order to provide adequate fuel when the engine is being started or when the engine is operated under heavy load conditions, the movement pattern of the stem of the fuel metering valve is compensated by a bellows assembly, the interior of which is connected to a vacuum pickup positioned in the intake manifold of the engine. With this arrangement high vacuum influences due to engine starting operations or heavy load conditions will tend to increase the passage size through the metering valve to increase the fuel flow. The required elevated fuel pressure is derived through use of a fluid pump, while the elevated fuel temperature is obtained by passing the fuel through a heat exchanger for the absorption of excess engine heat.

BRIEF DESCRIPTION OF THE DRAWINGS

Features of the invention are shown in the drawings, in which

FIG. 1 is a side elevation schematically illustrating a circuit arrangement of components used in a preferred embodiment of the invention, and FIG. 2 is a side elevation in partial section showing further details of components of the invention.

DESCRIPTION OF PREFERRED EMBODIMENTS

A preferred, though simplified, embodiment of the invention is shown in FIGS. 1 and 2. In FIG. 1 a gasoline internal combustion engine 11 is illustrated. The engine is provided with a fuel system inclusive of supply tank 12 and a main fuel line 13 that delivers fuel under pressure of gravity or a minor pressure as derived by a boost pump (not shown) to a main fuel pump 14. Pump 14 is mounted on the engine 11 and is adapted to be driven by a belt 16 interconnected to the fan 17 of the engine. The fuel pump used could be of a type similar to the conventional fuel pumps which are now in use on gasoline engines that are driven by a cam surface disposed within the engine crank case. Likewise, other types of gear or vane pumps could be used to obtain the desired fuel pressure. For the present installation it is desirable to have the fuel that is delivered to the mixing throat at an elevated gauge pressure of at least 40 p.s.i. Many pumps are available that are capable of pressures in the 40 to 100 p.s.i. range that could be suitably used for these purposes.

An outlet fuel line 18 from the pump 14 is introduced into a heat exchanger 19 at port 21. From this point of introduction a fuel line coil 22 is disposed within the heat exchanger 19 and about the baffles 23 to be connected to the output fuel line 24. The coolant for the internal combustion engine is also circulated through the heat exchanger and about the baffles in countercurrent relationship wtih respect to the fuel line coil 22. Accordingly, an inlet 26 for the coolant is disposed adjacent the outlet end of the coil 22, while the outlet 27 for the coolant is disposed adjacent to the inlet 21 for the fuel. The baffles cause the coolant to be circulated in contact with the fuel coil 22 but in countercurrent relationship thereto in order to obtain efficient heating of the fuel passing through the coil 22. Since the engine coolant will be at an elevated temperature, the temperature of the fuel in the outlet line 24 will be substantially elevated.

Efficient operation is obtained when the fuel is heated to a temperature of approximately 180° F. Since the vapor pressure of gasoline at 180° F. would normally cause complete vaporization of the fuel, the fuel is pressurized to keep it in the liquid state. With a proper combination of fuel pressure and temperature, the fuel delivered to the metering control valve 28 is still in the liquid state. When the fuel is released through the control valve 28 and its outlet nozzle 29, however, the fuel immediately vaporizes in the throat 31 of the mixing base 32. The resulting more active vaporization assures better intermixture with the incoming air being introduced through the mixing throat and into the intake manifold of the engine.

In the illustrated embodiment the atomized fuel is introduced into the throat 31 at a position closely adjacent to a rotatably mounted butterfly valve 33 which controls the introduction of air into the engine and which further serves to change the flow characteristics through the mixing base for the creation of vacuum influences. Since an additional vacuum condition may be created in the throat by reason of the disposition of the butterfly valve 33, conditions for further improvement in the vaporization characteristics of the fuel charge can be established by operation of the butterfly valve 33. The positioning of the butterfly valve can also serve to change the vacuum characteristics downstream from the butterfly and within the intake manifold of the engine.

To assure better starting characteristics for the type of fuel introduction and mixing system described and to provide compensation for increasing the fuel flow when the engine is subjected to heavy load conditions, the inventor prefers to provide a vacuum sensitive compensating device for further regulating the fuel flow characteristics of the metering valve 28. First, it should be noted that the fuel flow through the valve 28 is varied in accordance with variations in the positioning of the metering needle 34 with respect to the bore or valve seat opening 36 provided in the body 37 of the metering valve 28. Where the respective angles of taper for the bore 36 and the tapered portion 38 of the needle 34 are slightly divergent, a close control of the quantity flow of fluid can be maintained. An operative fuel/air metering system can be provided if a linkage connection is established between the throttle arm 39, which is attached to the shaft 41 for the butterfly valve 33, and the metering pin 34. With such direct connection, opening of the butterfly valve 33 will cause a corresponding opening of the fuel metering valve 28. With proper design of the valve to seat clearance 38–36 and the shape of the tapering surfaces of the metering pin and the valve bore, a good fuel/air mixture can be provided by such direct connection for all angular opening positions of the butterfly valve 33.

In order to provide an increased fuel/air mixture for engine starting purposes or for engine operations under heavy load conditions, some compensating mechanism is required. In the present embodiment a bellows compensating device is preferably used to interconnect the metering pin 34 and the throttle arm 39. As shown in FIG. 2, the metering pin 34 is connected to one end plate 42 of a bellows assembly 43, and an actuator arm 44 is connected to an opposite end plate 46. The actuator arm is connected by a rod 47 to the throttle arm 39. The interior of the bellows 43 is connected by a vacuum line 48 to a vacuum pickup opening at 49 in the throat of mixing base 32 downstream from the butterfly valve or in the engine intake manifold. With this construction increased vacuum (a decreased flow pressure) in the engine intake system will cause a shortening of the bellows assembly 43. This shortening of the bellows assembly will tend to retract the metering pin 34 to cause an increased fuel flow through the metering valve 28. Extension of the vacuum bellows 43 due to an increase of pressure in the intake flow system will reduce the fuel flow.

In order to obtain the best possible control of the fuel/air mixture for all engine operating conditions, the size, length and shape of the metering pin 34 and of the valve seat 36 must be closely regulated and balanced with respect to the size and inherent spring strength of the bellows 43 and the flow and pressure characteristics in the pickup opening 49. To provide an idle speed adjustment, an idle control valve 51 may also be used that opens into the throat 31 of the mixing base 32. When these factors and elements are properly considered and designed, the compensating system illustrated will have improved engine starting, heavy load and normal operating characteristics. The operation of the mixing base unit will in all respects be similar to a conventional carburetion system. Accordingly, operator control of the unit can be established by use of a foot throttle control linkage 52 connected to the throttle arm 39.

Operation of the device has proved it to be efficient and economical. The fuel economy possible is apparently based on the improved atomization and intermixing of fuel and air to permit operation at lower fuel/air ratios. The use of engine heat to increase the temperature of the income charge will also add to improved engine efficiencies. The countercurrent flow relationship established for the fuel and coolant flow patterns makes it possible to obtain the desirable fuel temperature more readily and efficiently.

I claim:

1. A fuel and air mixture control unit for use on internal combustion engines comprising a source of fuel in the liquid state, pump means for subjecting said fuel to pressure in excess of two atmospheres, heating means for increasing the temperature of the fule and correspondingly increasing the vapor pressure thereof to a value just under the vaporization temperature for the established pressure, an air intake structure for said units, fuel flow control apparatus for releasing said heated and pressurized liquid fuel into the intake air stream structure of said engine, an air flow control for regulating the volume of intake air, and linkage elements interconnecting said fuel flow and air flow controls for the establishment of proportionate flow ratios.

2. Structure as set forth in claim 1 and further comprising compensating means in said linkage elements for varying the deprived fuel/air ratio.

3. Structure as set forth in claim 2 and further comprising a pickup disposed in the fuel and air mixture intake structure of said engine that is sensitve to the flow pressures therein for interconnection to said compensating means.

References Cited

UNITED STATES PATENTS

| | | | |
|---|---|---|---|
| 1,281,778 | 10/1918 | Hifner. | |
| 1,376,201 | 4/1921 | Harris. | |
| 1,901,849 | 3/1933 | Moore | 12—131 |
| 2,322,991 | 6/1943 | Wunsch et al. | |
| 2,538,986 | 1/1951 | Switzer. | |
| 2,759,468 | 8/1956 | Powell et al. | |
| 3,110,296 | 11/1963 | Lundi. | |
| 3,331,360 | 7/1967 | Fleming | 123—130 X |

A. LAWRENCE SMITH, Primary Examiner

U.S. Cl. X.R.

23—34, 139, 140

UNITED STATES PATENT OFFICE
CERTIFICATE OF CORRECTION

Patent No. 3,509,859   Dated May 5, 1970

Inventor(s)   F. Pantano

It is certified that error appears in the above-identified patent and that said Letters Patent are hereby corrected as shown below:

In the claims:

Claim 1, line 5, change "fule" to read -- fuel -- .

Claim 2, line 3, change "deprived" to read -- derived -- .

SIGNED AND SEALED
FEB 2 1971

(SEAL)
Attest:

Edward M. Fletcher, Jr.
Attesting Officer

WILLIAM E. SCHUYLER, JR.
Commissioner of Patents